Jan. 9, 1940.　　S. F. ARBUCKLE ET AL　　2,186,000
SIGNALING SYSTEM FOR AUTOMOTIVE VEHICLES
Filed Feb. 15, 1935　　2 Sheets-Sheet 1
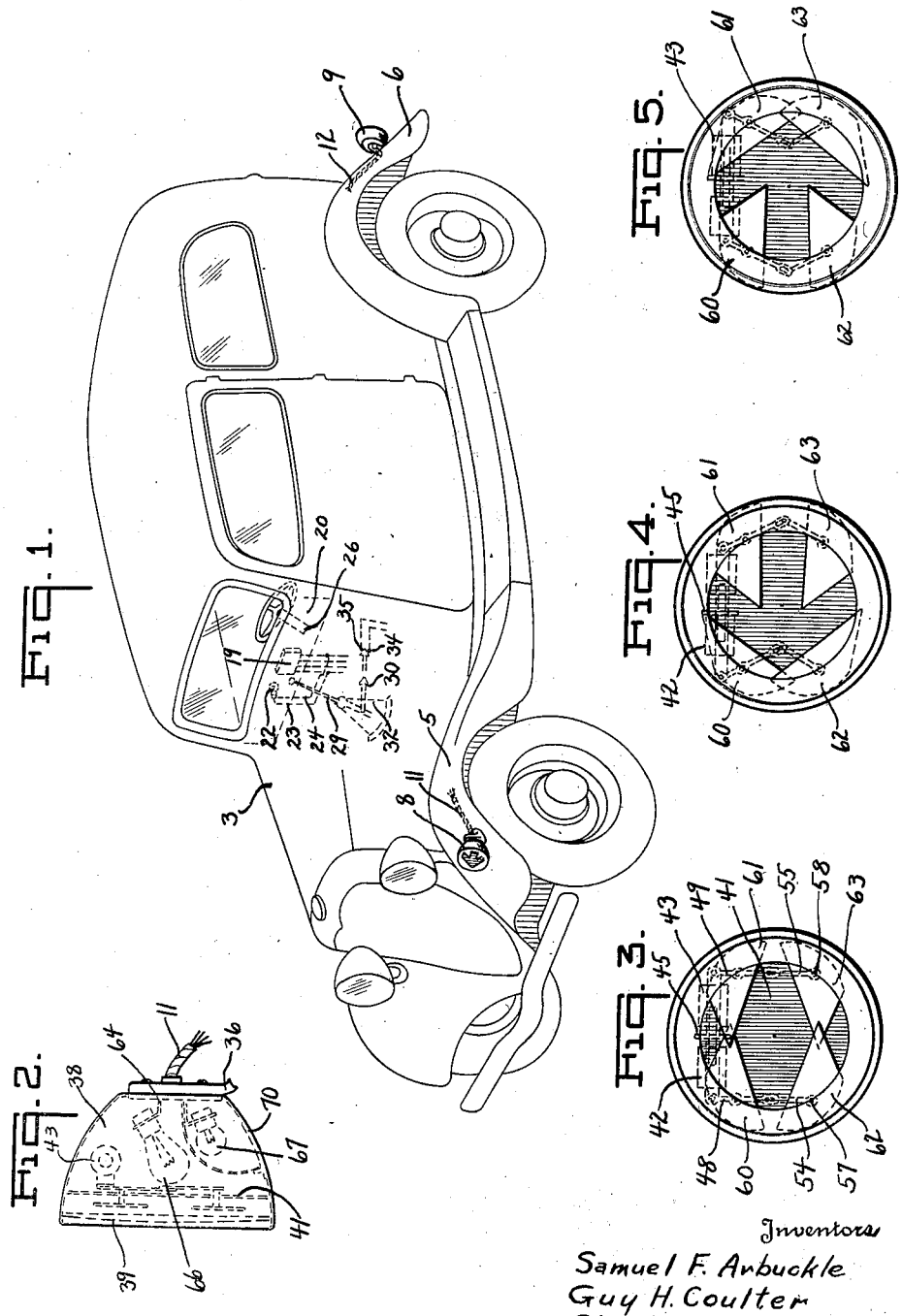
Inventors
Samuel F. Arbuckle
Guy H. Coulter
Charles E. Godley
By Braselton, Whitcomb & Davies
Attorneys

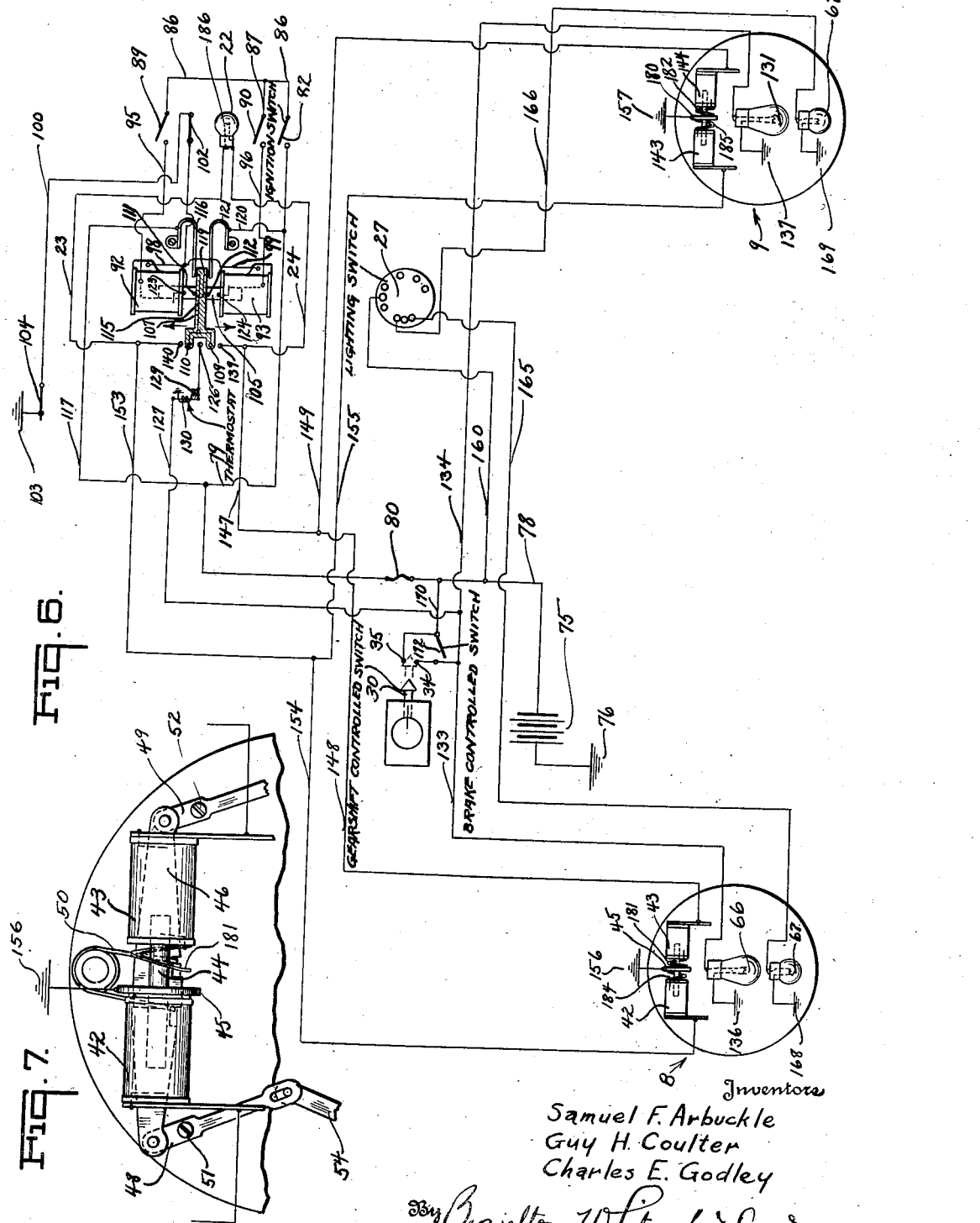

Patented Jan. 9, 1940

2,186,000

UNITED STATES PATENT OFFICE 2,186,000

SIGNALING SYSTEM FOR AUTOMOTIVE VEHICLES

Samuel F. Arbuckle, Guy H. Coulter, and Charles E. Godley, Highland Park, Mich., assignors to United Lens Corporation, Detroit, Mich., a corporation of Delaware Application February 15, 1935, Serial No. 6,716

9 Claims. (Cl. 177—337)

This invention relates to signaling systems and apparatus associated therewith and more particularly to indicating apparatus for use with directional signaling systems for automotive vehicles.

The invention contemplates the provision of a system for signaling devices including means to indicate directional movement of a vehicle, together with means for indicating operation of such signaling devices.

The invention embraces the provision of means for intermittently causing illumination of signaling devices.

An object of the invention is to provide conveniently positioned indicating means which will reveal any deficiency or failure in the operation of a signaling system.

Another object of the invention is to provide indicating means in combination with a direction indicating signal system to indicate proper or improper functioning of the system.

Further objects and advantages are within the scope of this invention such as relate to the arrangement, operation and function of the related elements of the structure, to various details of construction and to economies of manufacture and numerous other features as will be apparent from a consideration of the specification and drawings of a form of the invention in which:

Figure 1 illustrates an automobile with which is incorporated a form of the invention;

Figure 2 is a side view of one form of the directional signaling device;

Figures 3, 4 and 5 illustrate the indicia forming members in their different directional signaling positions;

Figure 6 is a diagrammatic view of the circuits used in connection with the signaling and indicating apparatus;

Figure 7 is a fragmentary enlarged view showing some of the component parts of the signaling device.

While we have illustrated a form of our invention as preferred in visually signaling the directional movement of a vehicle, it is to be understood that the invention may be used any place where it may have utility.

Referring to the drawings in detail, Figure 1 illustrates an automotive vehicle 3 wherein the front fender 5 and rear fender 6 are each provided with signaling devices 8 and 9 secured thereto. The signaling means 8 and 9 are provided with cables 11 and 12 respectively carrying a plurality of wires which electrically interconnect said signaling means with a suitable source of energy such as a storage battery, the circuit is controlled by a switching device 19 secured to any convenient position within the vehicle, preferably to the dashboard 20 of said vehicle.

Interconnected with the signaling device is provided a tell-tale or current consuming device in the form of the light bulb 22 having suitable conductors 23 and 24 which are connected to the wires leading to the switching device 19. This tell-tale device is preferably located within the vehicle in any convenient position to visually indicate to the vehicle operator the effective operation of the signaling system. In the present instance we have illustrated same as supported by the dashboard 20. The signaling devices 8 and 9 in addition to visually showing the direction of the vehicle incorporate the tail light warning signal the energization of which is controlled by the lighting switch 27 illustrated in Figure 6. This switch may be secured to the steering post 26 or other suitable support convenient to the vehicle operator. Also incorporated for use with the signaling circuit is a back-up or reverse directional signal associated with the gear shift lever 29 which may be provided at its lower extremity with an arm or member 30 projecting from the casing 32. The arm member 30 is movable into engagement with the contacts 34 and 35 by means of a forward movement of the gear shift lever 29, the contacts 34 and 35 being suitably connected to a source of electrical energy as will hereafter appear.

One of the signaling devices with which we have illustrated our invention is shown in Figure 2 and is illustrated in detail in our copending application Serial No. 740,400, filed August 18, 1934. A casing 38 is provided for enclosing the mechanism and a bracket 36 is secured thereto for supporting the device on a convenient portion of the vehicle. The bracket 36 and casing 38 are provided with openings to accommodate the cable 11 which carries a plurality of current conducting wires to their associated parts positioned in said casing. The open end of casing 38 is provided with a light emitting means such as the lens 39 which also serves to protect the mechanism enclosed. Spaced inwardly from lens 39 is a lens 41 secured to a rim (not shown) which further serves to support a pair of spaced electromagnets or coils 42 and 43.

The coils 42 and 43 illustrated in Figures 2 and 7 serve to actuate a reciprocating central core or bar 44 which is provided at its center portion with a disc 45. Secured to the disc 45 is an arm member 46, the end portions of which are connected to the ends of actuating arms 48 and 49. Arms 48 and 49 adjacent to their end portions are pivotally supported carrying at their pivotal point stub shafts 51 and 52 fixedly secured thereto. The other ends of arms 48 and 49 are operatively connected to the ends of actuating arms 54 and 55. The arms 54 and 55 are in turn pivotally supported at their respective ends fixedly carrying stub shafts as at 57 and 58. The intermediate lens 41 is provided with openings to accommodate a plurality of sleeves through which the stub shafts 51, 52, 57 and 58 extend. To the other end of each of the stub shafts is fixedly secured indicia members 60, 61, 62 and 63, which are located between front lens 39 and intermediate lens 41. Thus by this arrangement movement of bar 44 carrying disc 45 serves to simultaneously move the four indicia forming members. Means are provided to oppose this movement and preferably include a spring element 50 engageable with the arm 46. The inside of the rearward portion of the casing 38 serves to secure a bracket 64, which in turn supports a plurality of light sources 66 and 67. The light bulb 67 when illuminated serves as a warning signal to an approaching vehicle and by means of window 70 also serves to illuminate a license plate which may be secured below the signal device. The intermediate lens 41 is preferably of a different color than the indicia forming members in order to provide a definite contrast and increase the visibility of said indicia.

Figure 3 shows the indicia forming members in a neutral position. The indicia members 60, 61, 62 and 63 are shown in Figure 4 moved from the neutral position shown in Figure 3 to form the outline of a directional arrow indicating movement of the vehicle to the left. Said indicia members are actuated to indicate the signal shown by energization of the coil 42 which actuates the disc 45 which in turn moves the arms 48, 49, 54 and 55 to position said indicia members.

Figure 5 illustrates the indicia members 60, 61, 62 and 63 forming the outline of a directional arrow to the right. Said indicia members having been changed from the neutral position shown in Figure 3 to the position shown in Figure 5 by energization of the coil 43 and consequent action of the mechanism to indicate an arrow pointing to the right.

In Figure 6, a diagrammatic illustration of the circuit control used in connection with the signaling and direction forming indicia devices is illustrated wherein the indicating system of the invention is incorporated. A source of electrical energy such as battery 75 is connected through one terminal to a ground 76 and the other terminal of the battery is connected by conductors 78 and 79, including the fuse 80 to a switch 82, preferably the ignition switch in order to complete the circuit when the engine is started. The ignition switch 82 is also connected by means of the conductors or leads 86 and 87 with the switches 89 and 90. The switches 89 and 90 are connected respectively to a pair of opposed coils or electromagnets 92 and 93 by the leads 95 and 96, said coils 92 and 93 having connections 98, 99 and 100 leading to a ground 103. Serving as means to break the ground connection a switch 102 is provided in the lead 100 which may be manually actuated. We also provide another switch 104 to break the circuit to the ground, which switch may be automatically or manually actuated as desired.

The coils 92 and 93 serve to reciprocate an armature member 105 having fixedly positioned at its center portions a yoke or support 107 which serves to carry a plurality of suitably insulated contacts 109, 110, 111 and 112. Contacts 109 and 110 positioned on the extremities of the yoke 107 are connected to the source of energy or battery 75 by the conductor 115, spring 116, conductor 117, fuse 80 and conductor 78. Contacts 111 and 112 are insulatingly carried by the central portion of yoke 107, and are connected with the battery 75 by conductor 119, spring 121, conductors 120 and 79, fuse 80 and conductor 78. Adjacent the contacts 111 and 112, also connected with one end of the windings of coils 92 and 93, are contacts 123 and 124, which are capable of engagement with contacts 111 and 112 to also energize the coils 92 and 93.

Positioned between the contacts 109 and 110 is a contact 126 connected to thermoresponsive means 129 which is in turn connected by means of lead 127 and branch conductors 133 and 134 to light sources 66 and 131 of the signaling devices 8 and 9. The light sources 66 and 131 are suitably grounded as at 136 and 137.

In order to direct the attention of approaching drivers and other observers, the system includes means to intermittently project a beam of light whenever the directional signal is formed. In the present embodiment a thermoresponsive element 129 is heated by a coil 130 suitably grounded to intermittently illuminate the bulbs 66 and 131 as will hereinafter more fully appear. Positioned adjacent the contacts 109 and 110 are contacts 139 and 140. Contact 139 is connected with the coils 43 and 144 through means of conductor 147 and the branch conductors 148 and 149, and contact 140 is connected with the coils 42 and 143 by means of conductor 153 and branch conductors 154 and 155. Coils 42 and 43 may be grounded as at 156 while coils 143 and 144 are provided with a ground as at 157. Contacts 139 and 140 are also connected by leads 23, 24 respectively to the filament 186 of the telltale or bulb 22. The lighting switch 27 is connected to the battery 75 through leads 160 and 78. Switch 27 is in electrical connection with the light sources 67 through conductors 165 and 166. The light sources 67 which serve as tail lights or warning signals are provided with grounds 168 and 169. One side of a switch 172 is connected to the battery 75 by means of leads 170 and 78. The other side of switch 172 is connected by leads 133, 134 to the light sources 66 and 131 respectively. In parallel with the switch 172 are a plurality of spaced contacts 34 and 35 adapted to be closed by means of the arm member actuated by the gear shift lever 29 in lieu of closing switch 172. The actuating electromagnets 92 and 93 and associated parts as well as the operating switches 89, 90, 102 and 104 and the manually actuated switch 172 may form the component parts of the switching device 19 which as hereinbefore described is supported by the dashboard of the vehicle.

The coils 43 and 144 are energized by current from the battery 75 passing through the leads 78 and 117, spring 116 and leads 115 and 147, branch conductors 148 and 149 to the coils. During the interval of time in which the coils 43 and 144 are being energized sufficiently to magnetically attract the armature discs 45 and 180 the light source 22 is illuminated by the current which passes from the battery through switch terminal 109 contacted with terminal 139, conductor 24, filament 186, conductors 23 and 153, branch conductors 154 and 155, coils 42 and 143, spring contacts 184 and 185 to grounds 156 and 157. The purpose of the temporary illumination of the light source 22 is to indicate to the driver of the vehicle that the device has functioned and when the coils 43 and 144 are energized sufficiently to completely attract the armature discs 45 and 180, the illumination from the light source 22 is extinguished due to the disconnection of the discs 45 and 180 and the springs 184 and 185.

For the purpose of illustration, one of the signaling devices is shown in Figure 7 with the armature disc completely attracted by the coil 42 and as the disc 45 is separated from the spring 181, the total current is directed to the ground 156. The brief illumination of the light source 22 indicates to the driver of the vehicle that the system has functioned properly. If no illumination occurs, some element of the system has failed and should the light source remain illuminated, it will indicate to the driver of the vehicle that the indicia members have not moved.

The operation of the signaling system and devices incorporated therein will now be described. With the ignition switch 82 closed, current from the battery 75 flows through the conductors 78, 79, 86 and 87 to the switches 89 and 90. By closing the switch 90, the device operates to indicate a directional signal to the right. The momentary closing of switch 90 permits energization of the coil 93 and the armature 105 will be attracted by magnetic force and the yoke 107 will be moved into close proximity to coil 93, thereby closing contacts 112 and 124. The energization of coil 93 is maintained by current from the battery 75 flowing through conductors 79 and 120, spring 121, to lead 119 in engagement therewith, thence to contact 112 in engagement with coil contact 124, the windings of electromagnet 93 to lead 99, thence to switch 102, lead 100, switch 104 and ground 103. Simultaneously with the closing of contacts 112 and 124, contact 110 engages contact 126 to intermittently illuminate the light sources 66 and 131 by connecting into the circuit the thermo responsive device 129. Also the contacts 109 and 139 are simultaneously engaged upon engagement of contacts 110 and 126. The engagement of contacts 109 and 139 completes the circuit to the coils 43 and 144 to attract the armatures 45 and 180 during which time, and until the circuit through spring contacts 184 and 185 and coils 42 and 143 is broken, the filament 186 in bulb 22 is illuminated.

When the signal formed has served its purpose, the opening of the switch 102 breaks the circuit to the ground 103, de-energizing the actuating circuit coils 92 and 93, and the electromagnets actuating the indicia forming members, thus permitting the indicia members to return to a neutral position by the tension of the conductor springs as well as the spring 50 coacting with member 46. A directional signal arrow in the opposite direction is formed by closing the switch 89 which energizes the coil 92, rendering that portion of the circuit effective to energize the coils 42 and 143 and thus move the indicia members in the opposite direction, in a manner similar to that hereinbefore described.

The lighting switch 27 controls the operation of the warning tail light sources 67. The closing of the contacts at switch 27 causes current from the battery 75 to pass through the conductors 78 and 160, hence through conductors 165 and 166 to the light sources 67, which are grounded as at 168 and 169. When the vehicle is to be moved rearwardly, movement of the gear shift lever causes the arm 30 to engage the contacts 34 and 35, thus energizing the light sources 66 and 131 which are suitably grounded as at 136 and 137. The circuit is broken by the disengaging of the arm member 30 from the contacts 34 and 35. Switch 172 may be connected to the vehicle braking system in a conventional manner and will serve to indicate that the vehicle is coming to a stop by completing the circuit from the battery to the light sources 66 and 131.

It is apparent that, within the scope of the invention, modifications and different arrangements may be made other than is herein disclosed, and the present disclosure is illustrative merely, the invention comprehending all variations thereof.

What we claim is:

1. In combination, a directional signaling device including movable means operable by the energization of electro-magnetic means to produce direction signals; a circuit for energizing said electro-magnetic means from a source of current; an electrically energizable tell-tale device connected in said circuit; means to control the flow of current from the source to said electro-magnetic means and said tell-tale device; means operable by the flow of current after the same has been established through said electro-magnetic means to discontinue by the operation of said movable means the energization of said tell-tale device.

2. In combination, a tell-tale device; a normally open circuit connecting said tell-tale device with a source of current; a current consuming signaling device interconnected in said circuit for actuating movable elements; means to close said normally open circuit to establish an energy flow to said tell-tale device and said current consuming signaling device; switching means in said circuit operable by the movement of the elements actuated by the current consuming signalling device to interrupt the flow of current to said tell-tale device when said signaling device is in operation, said means being rendered ineffective to interrupt the flow of current upon failure of operation of the movable elements of said signalling device whereby continuous energization of the tell-tale device is present during the time said circuit closing means are in circuit closing position.

3. In combination, a current consuming device capable of indicating a circuit condition; a normally open circuit connecting said current consuming device and a source of current; a current actuated signaling device interconnected in said circuit including movable means operable to control the energy flow to said current consuming device; means to close said normally open circuit to establish an energy flow in said circuit energizing said signaling device and said current consuming device for a short time while said closing circuit means are in operation, the connections of the movable means of the signaling device with the circuit of the current consuming device being such that the continuous energization of the current consuming device is dependent upon the failure of the movable means of the signaling device to function.

4. In combination, a plurality of interconnected electrical circuits; a current consuming means capable of indicating a circuit condition interconnected in one of said circuits; a current consuming signaling device in another of said circuits; main switching means for connecting said circuits to a current source; a normally closed circuit interrupting means in the circuit of said current consuming means; means operable in response to the current flow in said current consuming signaling device for operating said circuit interrupting means to stop the flow of current to said current consuming means, said circuit interrupting means being ineffective upon failure of current flow to said signaling device whereby continuous energization of the current consuming means is present during the time that the main switching means is connecting said circuits to said current source.

5. In combination, a signaling device including electrically operative means adapted to be connected through an energizing circuit to a source of current for actuating movable elements to indicate a direction signal; and energizable telltale remotely connected with said device and adapted to be connected through an energizing circuit to a source of current; switching means operable to establish a flow of current from said current source to said device and said tell-tale; and means actuated by movement of the movable elements of the directional signaling device to direction indicating position for de-energizing said tell-tale.

6. An illuminated signaling system for vehicles in combination, light obstructing means adapted to be moved to define a light penetrable area; electro-responsive means having connections for causing their energization from a current source for moving said light obstructing means to a selective position forming light penetrable areas of predetermined contour; a light source associated with said light obstructing means having connections for causing its energization from said current source; visual operation indicating means interconnected with the circuit of said electro-responsive means; switching means for controlling simultaneously the energization of said electro-responsive means, the light source and the visual indicating means from said common current source causing the production of an illuminated area of predetermined contour; means initiated by said switching means in circuit with said light source to cause a periodic energization of the light source to intermittently illuminate the predetermined light penetrable area formed by the light obstructing members; and a second switching means concurrently actuated upon the movement of the light obstructing means to produce a light penetrable area of predetermined contour for interrupting the energization of said visual operation indicating means.

7. An illuminated signaling system for vehicles, in combination, a plurality of light obstructing movable members; electro-responsive means having a circuit for causing their energization for actuating said members to form a direction signal area through which light passes; a light source having an energizing circuit therefor for illuminating said area; visual means in the circuit with said electro-responsive means; manually controlled switching means for simultaneously connecting the circuits of said electro-responsive means, of said light source and of said visual means to a common current source; means initiated by said switching means to cause the periodic energization of said light source to intermittently illuminate the direction signal area formed by said members; auxiliary switching means concurrently actuated upon the movement of said members to the direction signalling area to open the circuit of the visual means whereby the visual means operates to momentarily visually indicate the complete functioning of said electro-responsive means.

8. An illuminated signaling system for vehicles, in combination, light obstructing members adapted to be moved to define a light penetrable area; electromagnetic means having connections for causing their energization from a current source for moving said light obstructing members to a selective position forming light penetrable areas of predetermined contour, a light source associated with said light obstructing means having connections for causing its energization from said current source; visual operation indicating means, interconnected with the circuit of said electromagnetic means; manually operable switching means for controlling simultaneously the energization of said electromagnetic means, the light source and the visual indicating means from said common current source causing the production of an illuminated area of predetermined contour; means initiated by said switching means in circuit with said light source to cause the intermittent illumination of the predetermined light penetrable area formed by the light obstructing members; and normally closed second switching means adapted to be opened by means concurrently actuated with the movement of the movable light obstructing members whereby failure of the members to move to a position to produce a penetrable area of predetermined contour causes the continuous energization of said visual operation indicating means.

9. In combination a signaling device including at least two energizable coils having circuit connections for causing the flow of current thereto from a current source; a tell-tale device remotely located with respect to said signalling device and circuit connections therefor; means for selectively connecting either of said coils directly to the source of current and for connecting said tell-tale device in series with the other of said coils to said source; a plurality of movable members operable by the direct energization of either of said coils; and switching means controlled by the flow of current through the directly connected coil to cause the interruption of the flow of current to the tell-tale device and the other coil.

SAMUEL F. ARBUCKLE.
GUY H. COULTER.
CHARLES E. GODLEY.